United States Patent
Ueno et al.

(10) Patent No.: US 8,107,263 B2
(45) Date of Patent: Jan. 31, 2012

(54) SERIES RESONANT CONVERTER

(75) Inventors: Shingo Ueno, Tokyo (JP); Shinichi Omaki, Tokyo (JP); Atsushi Saito, Tokyo (JP); Kiyomi Watanabe, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 12/954,700

(22) Filed: Nov. 26, 2010

(65) Prior Publication Data

US 2011/0128758 A1   Jun. 2, 2011

(30) Foreign Application Priority Data

Nov. 27, 2009   (JP) ................ 2009-270337

(51) Int. Cl.
*H02M 3/335*   (2006.01)
(52) U.S. Cl. ................ 363/21.02; 363/98
(58) Field of Classification Search .......... 363/15–17, 363/20, 21.02, 21.03, 95, 98, 131, 132
See application file for complete search history.

(56) References Cited

U.S. PATENT DOCUMENTS

| | | | | |
|---|---|---|---|---|
| 4,805,081 | A * | 2/1989 | Chambers et al. | 363/96 |
| 7,986,535 | B2 * | 7/2011 | Jacobson et al. | 363/17 |
| 2005/0180175 | A1 * | 8/2005 | Torrey et al. | 363/17 |
| 2008/0298093 | A1 * | 12/2008 | Jin et al. | 363/21.06 |
| 2009/0231887 | A1 * | 9/2009 | Ye et al. | 363/21.02 |
| 2009/0290389 | A1 * | 11/2009 | Ueno et al. | 363/21.02 |
| 2011/0051464 | A1 * | 3/2011 | Lou et al. | 363/21.02 |

FOREIGN PATENT DOCUMENTS

JP   2006-191766   7/2006

* cited by examiner

*Primary Examiner* — Adolf Berhane
(74) *Attorney, Agent, or Firm* — Hoffmann & Baron LLP

(57) ABSTRACT

A series resonant converter circuit that reduces power loss is provided that includes an inverter circuit having at least a pair of first and second switching elements that is connected between DC input terminals, a transformer connected to this inverter circuit, a resonant inductance means that are connected in series to a primary winding wire or a secondary winding wire of the transformer, a primary-side resonant capacitor that is connected in series to the resonant inductance means through the first or second switching element, first and second secondary-side resonant capacitors that are connected to each other in series between the DC input terminals, first and second unidirectional elements that are connected to each other in series between the DC output terminals, and a resonant inductance means that cooperates with resonant capacitance from the primary-side resonant capacitor and the first and second secondary-side resonant capacitors to resonate in series.

6 Claims, 11 Drawing Sheets

SERIES RESONANT CONVERTER

CROSS-REFERENCE TO RELATED APPLICATION

The present application claims the benefit of priority of Japanese Patent Application No. 2009-270337, filed on Nov. 27, 2009, the content of which is hereby incorporated herein by reference.

FIELD OF THE INVENTION

The present invention relates to a series resonant converter circuit that utilizes a serial resonant effect of a resonant inductance means and a resonant capacitor, and more specifically relates to a series resonant converter circuit having characteristics that are suitable for a direct current sputtering power supply that is suited to a discharge load such as plasma, a capacitor of which load voltage drastically changes, and a charging DC power supply such as a battery.

BACKGROUND OF THE INVENTION

As a discharge load using discharge energy, there are various laser devices, a discharge lamp lighting device, a strobe device, an electro-discharge machining device, a fusion splicing device of optic fiber, and a vacuum device for forming metallic thin films on the surfaces of various materials by discharging, and discharge loads are broadly used in various technical fields. These discharge loads often require constant power.

In a case of a discharge load power supply unit as described above, since the output voltage fluctuates in a certain range, depending on a plasma state, the constant power should be ensured in the range. For example, in a case in which the output is 800 W, the rated output voltage is 800 V, and output current that can be supplied at that time is 1 A. Then, when the output voltage is 400 V, it is required to supply the output current of 2 A to a discharge load. However, in a normal discharge load power supply unit, when designing a power supply with 800 V-1 A, the maximum current at 400 V is at most approximately 1 A (depending on its circuit mode). The output power of 800 W cannot be satisfied by either the constant output voltage of 800 V or the output voltage of 400 V, which is substantially lower than 800 V.

Among such power supply units, some are configured so that it is possible to output power of 400 V-2 A by providing a medium voltage tap to a secondary-winding wire of a transformer 6 to switch the output terminal to the medium voltage tap to produce low voltage/large current. However, for switching of the tap, a switching operation has to be done by opening a housing of the power supply unit, which is troublesome since it requires time and effort, while safety must be ensured by confirming the discharge of residual charge upon switching.

In order to avoid this, it is necessary to design a power supply with large capacity that can supply maximum current. For example, in the previous example, it is necessary to manufacture a power supply unit with power capacity of 800 V-2 A, i.e. a power supply device that can output 1.6 kW. In this case, since the power of a transformer is substantially proportional to the product of the maximum voltage and the maximum current, a transformer having a power capacity with 1.6 kW is needed, and the power of the transformer becomes approximately double the transfer power of 800 W. This is obviously not cost-effective since the entire power supply unit becomes larger and heavier, which leads to an increase in cost.

Inventions that solve the above problems have been proposed. For example, the invention disclosed in Japanese Unexamined Patent Application, Publication No. 2006-191766 (hereinafter referred to as Patent Document 1) realizes a multi-functional rectification circuit that can supply a substantially constant power by operating to be automatically mutually switched between a normal full-wave rectification circuit and a voltage doubler rectification circuit, depending on a requirement of load current. This automatic switching is performed electronically without necessitating a physical switching such as a mechanical switch and a semi-conductor switch, as well as switching of a medium voltage tap of the transformer. In addition, in a case of the load being a discharge load, it is possible to supply voltage that is approximately double the alternating voltage necessary to generate discharge using an extremely simple circuit configuration and a simple normal pulse-width control method of an inverter circuit, and when the discharge load becomes a discharge state and a low impedance, it is possible to supply a DC constant power required to maintain a steady discharge state having a voltage that is lower than the initial high voltage.

The DC power supply disclosed in Patent Document 1 is a series resonant converter circuit that causes resonant inductance and a resonant capacitor to resonate in series in order to improve power conversion efficiency. The resonant converter circuit can obtain a sinusoidal resonant current waveform. However, a case of using a resonant converter circuit as a DC power supply for a vacuum device has the following problem. Although the load power required for a vacuum device, i.e. a DC output power required in a resonant converter circuit, generally requires constant power, plasma voltage greatly changes depending on changes in the gassing conditions, target materials, etc. as described above. In this case as well, pulse width control is performed on a resonant converter circuit so as to make substantially constant output power.

Since a resonant converter circuit is generally designed for the operation with rated voltage, the resonant converter operating at the rated voltage outputs a sinusoidal resonant current. However, the resonant current waveform deviates from the sinusoidal waveform accompanying the gradual decline in the DC output current from the rated voltage. For example, in a case in which the output voltage is lower to approximately half the rated voltage, and the output current must be amplified up to approximately double the rated current, since the resonant current of the resonant converter becomes an AC waveform that deviates from the sinusoidal waveform according to the principles of resonance, the power efficiency of the resonant converter circuit declines and noise becomes large.

SUMMARY OF THE INVENTION

The present invention has an object of improving a resonant current waveform to be a sinusoidal wave or nearly a sinusoidal waveform by changing the capacity of resonant capacitance in a serial resonant circuit composed of a resonant inductance means and a resonant capacitor automatically when the load voltage and the load current change greatly, thereby raising the power efficiency of a series resonant converter over a broad load range.

A series resonant converter circuit according to an embodiment of the present invention includes an inverter circuit that connects a pair of first and second switching elements that are connected between a pair of DC input terminals with first and second primary-side resonant capacitors in a half-bridge configuration, a transformer having a primary winding wire and secondary winding wire that are connected to this inverter circuit, a multi-functional rectification circuit composed of a first secondary-side resonant capacitor and a second secondary-side resonant capacitor that are connected to each other in series between a pair of the DC output terminals and a first rectifying diode and a second rectifying diode that are connected to each other in series between the DC output terminals, and a resonant inductance means that cooperates with resonant capacitance by the first and second primary-side resonant capacitors and the first and second secondary-side resonant capacitors to resonate in series.

The first and second primary-side resonant capacitors have capacitance which is approximately equal to a capacitance from converting the second secondary-side resonant capacitor to the primary-side of the transformer, and this capacitance is generally substantially smaller compared to capacitance of the smoothing capacitor that is provided to the DC output side. For a case of a constant power output, in a load impedance condition in which the DC output power is high and the DC output current is small (hereinafter, also referred to as a high load condition), the resonant inductance means resonates in series with the resonant capacitance by means of the first and second primary-side resonant capacitors and the first and second secondary-side resonant capacitors. However, in a load impedance condition in which the DC output voltage is low and the DC output current is large (hereinafter, also referred to as a low load condition), since most of the current flowing in the secondary winding wire of the transformer flows in the full wave rectification circuit that is composed of the secondary-side diodes connected in parallel to the first and second secondary-side resonant capacitors and the first and second rectifying diodes to be rectified, the first and second secondary-side resonant capacitors have substantially no contribution to resonant operation, and the resonant inductance means mainly resonates in series with the resonant capacitance by the first and second primary-side resonant capacitors.

Since, for a case of a constant power load, the present invention makes a resonant current waveform to be a sinusoidal wave or nearly a sinusoidal waveform by changing the resonant capacitance in a serial resonant circuit composed of a resonant inductance and a resonant capacitor automatically, when the load voltage and the load current change greatly, it is possible to reduce power loss of the series resonant converter and reduce noise without using a resonant capacitance switching mechanism or the like. Furthermore, in a high load impedance state, since the secondary-side resonant capacitors that are connected to each other in series and the rectifying diodes that are connected to each other in series configure a voltage doubler recitification circuit, the recovery current due to the feedback diodes in parallel to the switching elements does not flow, a result of which recovery loss, noise, and the like do not occur.

In addition, since the series resonant converter circuit according to another embodiment of the present invention is further configured in a circuit configuration that does not allow current that feedbacks to the DC power supply from the resonant circuit, i.e. leading current, to flow, and so that the voltage of the primary-side resonance capacitor does not exceed the DC power supply voltage, recovery current does not flow to the feedback diode even in the low load condition. Therefore, it is possible to further reduce power loss as well as reduce noise.

DETAILED DESCRIPTION OF THE INVENTION

In the following, embodiments of the present invention will be explained with reference to the drawings. In the present invention, effective resonant capacitance decreases when a load becomes high impedance, and effective resonant capacitance increases when a load changes to low impedance. In this way, since the effective resonant capacitance changes automatically according to the load impedance condition, it is possible to improve the waveform of a resonant current to be a sinusoidal wave in a broad load impedance region. It should be noted that the present invention is not limited to embodiments described below. Components denoted by the same reference number in the specification and the drawings refer to the same component.

Figure 1:
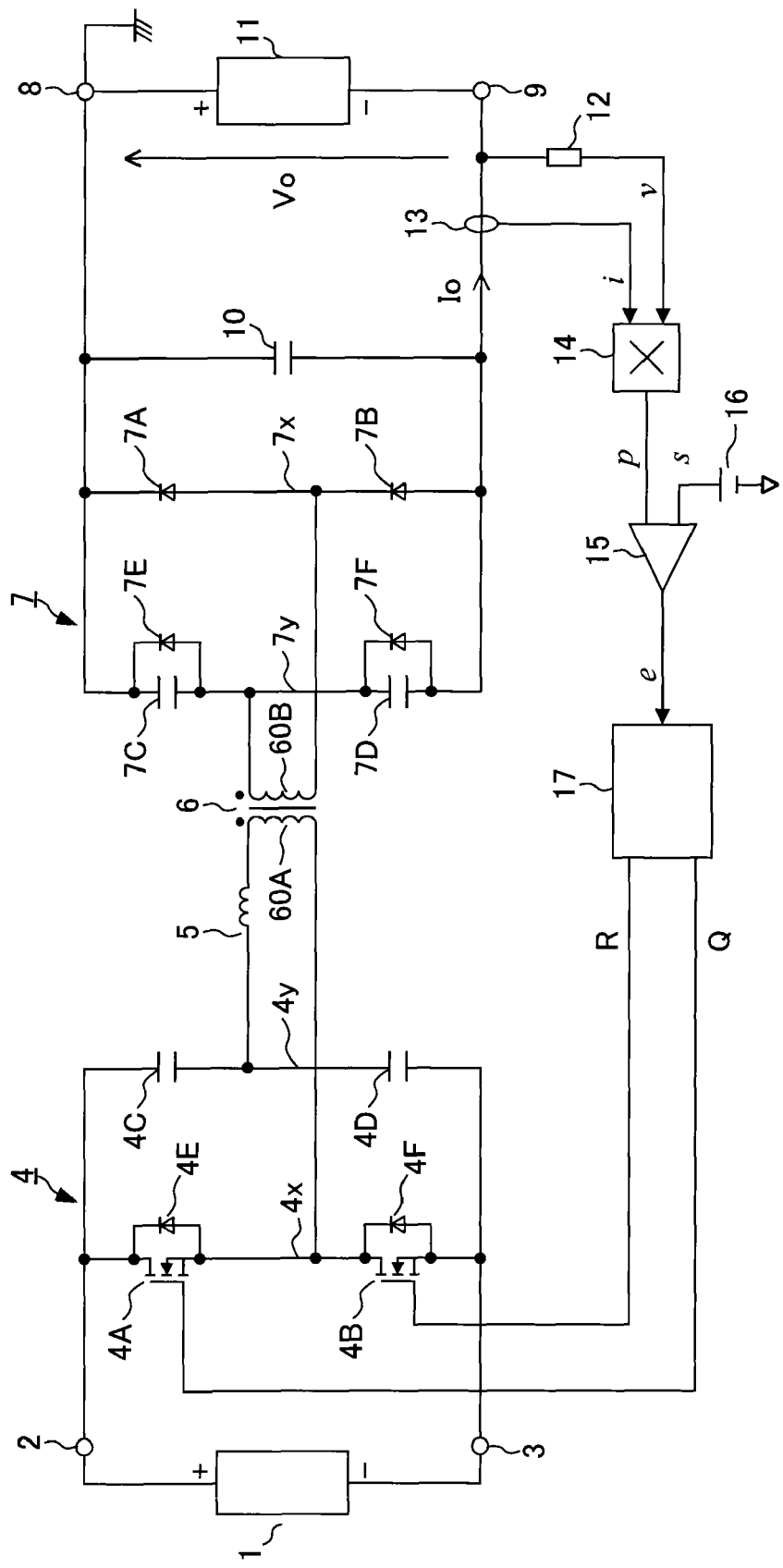
FIG. 1 is a circuit diagram showing a series resonant converter according to a first embodiment of the present invention.

A series resonant converter circuit of a first embodiment according to the present invention is explained with reference to FIGS. 1 to 6G. In FIG. 1, a DC power supply 1 is connected between a DC input terminal 2 of a positive terminal and a DC input terminal 3 of a negative terminal. The DC power supply 1 is a common device that is composed of a rectification circuit that rectifies single phase or three-phase AC power into DC power and a filter circuit that smoothes the DC power. In addition, the DC power supply 1 may be an energy source such as a battery or electric generator. Furthermore, the DC power supply 1 may be a rectifier including a PFC (power factor improvement circuit). In this case, an input voltage of the series resonant converter of the present invention, which is connected to a subsequent stage of the PFC, is stabilized. Therefore, since only load fluctuations should be considered regarding an operational aspect thereof, which is advantageous to the understanding of the present invention, it is explained in the following descriptions as well that a DC power supply voltage E between the DC input terminals 2 and 3 is a constant value.

An inverter circuit 4 is composed of a circuit in which first and second switching elements 4A and 4B, which are connected in series to each other, are connected to first and second, primary-side resonant capacitors 4C and 4D, which are connected in series to each other, in a half-bridge configuration. First and second feedback diodes 4E and 4F are connected in parallel to the switching elements 4A and 4B, respectively, with the polarities of the first and second feedback diodes 4E and 4F opposite to those of the switching elements 4A and 4B. The drain-side of the switching element 4A and one end of the primary-side resonant capacitor 4C are connected with the DC input terminal 2, and a source-side of the switching element 4B and one end of the primary-side resonant capacitor 4D are connected with the DC input terminal 3. A semiconductor device such as a MOSFET or IGBT is used for the switching elements 4A and 4B.

The feedback diodes 4E and 4F may be diodes that are externally connected in parallel or diodes formed in the switching elements 4A and 4B, respectively. If the switching elements 4A and 4B are MOSFET, internal diodes included in the MOSFET can be used as the feedback diodes 4E and 4F. It should be noted that almost all semiconductor devices such as normal MOSFET and IGBT contain an internal diode. These feedback diodes 4E and 4F have a function of limiting turn-off voltage of the switching elements 4A and 4B to the DC power voltage E by allowing the excitation current of a transformer (described later) to feedback to the DC power 1 when the switching element 4A or 4B is turned off The primary-side resonant capacitors 4C and 4D have a nearly equivalent capacitance Cp, respectively, and contribute to a serial resonance (described later) with a parallel-combined capacitance 2Cp that is equal to the capacitance of equivalently coupling the primary-side resonant capacitors 4C and 4D in parallel. Furthermore, the resonant inductance means 5 is connected to a conducting wire 4y that connects the primary resonant capacitors 4C and 4D and is connected to one end of a primary winding wire 60A of the transformer 6. The other end of the primary winding wire 60A of the transformer 6 is connected to the conducting wire 4x that connects the switching elements 4A and 4B. Here, the transformer 6 has a turn ratio n of a secondary winding wire 60B with respect to the primary winding wire 60A. Black dots attached to the primary winding wire 60A and the secondary winding wire 60B denote the polarity of the winding wires. The resonant inductance means 5 may be connected between the conducting wire 4x and the other end of the primary winding wire 60A of the transformer 6.

A multi-functional rectification circuit 7 that rectifies the AC voltage of the secondary winding wire 60B is connected to the secondary winding wire 60B of the transformer 6. The multi-functional rectification circuit 7 is composed of rectifying diodes 7A and 7B, which are connected in series to each other, a first secondary-side resonant capacitor 7C and a second secondary-side resonant capacitor 7D, which are connected in series to each other, and secondary-side diodes 7E and 7F that are connected in parallel to the secondary-side resonant capacitors 7C and 7D, respectively, and prevents reverse charging thereof. These rectifying diodes 7A and 7B, the secondary-side resonant capacitors 7C and 7D, and the secondary-side diodes 7E and 7F are all connected between DC output terminals 8 and 9. A conducting wire 7x that connects the rectifying diodes 7A and 7B is connected to one end of the secondary winding wire 60B of the transformer 6. A conducting wire 7y that connects the secondary-side resonant capacitors 7C and 7D is connected to the other end of the secondary winding wire 60B of the transformer 6. In addition, a smoothing capacitor 10 and a load 11 such as a DC plasma discharge chamber with a broad load impedance range are connected between the DC output terminals 8 and 9. A positive pole can be grounded for this type of load as shown in FIG. 1.

In the present invention, since the secondary-side resonant capacitors 7C and 7D use capacitors having capacitance Cs, which is a small value relative to the primary-side resonant capacitors 4C and 4D, and are arranged in series equivalently with respect to DC, the capacitance becomes half and those do not have a function of a filter capacitor as an energy bank. Therefore, the smoothing capacitor 10 is provided in a case of a series resonant converter requiring low ripple. It is preferable that this smoothing capacitor 10 has a capacitance from several tens to more than several hundred times that of the capacitance of the secondary-side resonant capacitors 7C and 7D. Although described later, if the multi-functional rectification circuit 7 is in a high-load condition (the load 11 is in a high impedance state), it functions as a voltage doubler rectification circuit and the secondary-side resonant capacitors 7C and 7D contribute to serial resonance. However, if it is in a low load condition (the load 11 is in a low impedance state), the multi-functional rectification circuit 7 functions as a normal full-wave rectification circuit with respect to a large portion of the rectification current and the secondary-side resonant capacitors 7C and 7D hardly contribute to serial resonance.

A DC output voltage Vo supplied to the load 11 is detected as a DC detected voltage v through a voltage detector 12 such as a resistor and also detected as a current signal i through a current detector 13 such as a hall CT. This DC detected voltage v and the detected current signal i are supplied to a multiplication circuit 14, and the multiplier circuit 14 performs an operation of v×i and provides a load power signal p as an output signal to an error amplifier 15. The error amplifier 15 compares a power setting signal s of a reference source 16 with the load power signal p and provides an error amplification signal e to a pulse frequency generating circuit 17. The pulse frequency generating circuit 17 provides the switching elements 4A and 4B with drive pulse signals Q and R having 180 degrees of phase difference at a limited frequency in response to the error amplification signal e.

For example, a conversion frequency of the inverter circuit 4 is set to be 50 kHz and a ON time is set to be a fixed pulse width of 9 μs, which is equal to 90% of a half circle (10 μs), while 1 μs is set as a dead time (a downtime) for preventing concurrent conduction of the switching elements 4A and 4B that are arranged one above the other. A pulse-frequency modulation (PFM) control method is used in which, with the conversion frequency being set to 50 kHz as an upper limit frequency, output power is increased by making the frequency high and the output power is decreased by lowering the frequency. Therefore, a control method can be employed in which, in a case of a rated maximum output, the conversion frequency of the inverter circuit 4 is close to 50 kHz, and, in a case of light load, the frequency lowers to a frequency close to an audible frequency.

It should be noted that, in an actual series resonant converter circuit, although insulation between a potential of the DC power source 1 and a potential of the load 11 in a signal system is necessary and a signal isolation element such as a photo coupler and a pulse transformer is necessary somewhere in the signal paths of the voltage detector 12, the current detector 13, the multiplier 14, the error amplifier 15, the pulse frequency generating circuit 17, and the gate terminals of the switching elements 4A and 4B, those are not necessary for explaining the operations of the present invention, and are thus abbreviated.

In addition, in FIG. 1 and all of the embodiments described later, although the resonant inductance means 5 is shown as a separate component from the transformer 6, it is possible to make the resonant inductance means 5 unnecessary by using leakage inductance or it is possible to reduce an inductance value of the resonant inductance means 5 by a value of the leakage inductance. Furthermore, in a case of the resonant inductance means 5 being a separate component, the resonant inductance means 5 can be connected in series to the secondary winding wire 60B, and not the primary winding wire 60A of the transformer 6. Therefore, the resonant inductance means being the inductance necessary to perform the desired serial resonance may be mainly composed of the resonant inductance means 5, a case in which a leakage inductance of a desirable power of the transformer 6 is utilized and a separate inductance means is not utilized, or a case in which the resonant inductance means 5 and the leakage inductance of the transformer 6 are combined. Here, it is referred to as a resonant inductance L in either case.

Next, the capacitance Cp of the primary-side resonant capacitors 4C and 4D and the capacitance Cs of the secondary-side resonant capacitors 7C and 7D, which are characteristics of the present invention for handling constant power load such as a DC plasma power supply, is explained. As described above, the state of the constant power load such as a DC plasma power supply may often possesses two load states in which one is that the load 11 is in a high impedance state (a high load condition) and the other is that the load 11 is in a low impedance state (a low load condition). For the series resonant converter circuit of the present invention, a state of resonance differs depending on the high load condition and the low load condition, as described below. For example, in a case of a constant power load being 800 W, the high load condition becomes the condition of high load voltage Voh of 800 V and low current 1 A, and the low load condition becomes the condition of low load voltage Voll of 400 V and high current 2 A. It should be noted that this case is merely an example and the present invention is not limited to these values of load power, high load condition, and low load condition.

In the present invention, it is preferable to select the capacitance Cs of the secondary-side capacitors 7C and 7D so that a DC output power Po in the high load condition is entirely supplied with a charge-discharge cycle of the secondary-side resonant capacitors 7C and 7D. It is desirable that the respective capacitances Cs of the secondary-side resonant capacitors 7C and 7D are calculated by the formula: $Cs=Po/2\times fs\times Voh^2$, where Po is DC output power, Voh is high load voltage, and fs is conversion frequency. In a specific example, the capacitances Cs of the secondary-side resonant capacitors 7C and 7D becomes 12.5 nF based on the formula, provided that the DC output power Po is 800 W, the high load voltage Voh is 800 V and the conversion frequency fs is 50 kHz. This value is sufficiently small as compared to the capacitance of a general smoothing capacitor 10 in a series resonant converter with approximately 800 W.

Furthermore, in the present invention, regardless of the load impedance being high or low, it is desirable to select the primary-side resonant capacitors 4C and 4D so that the DC output power Po is supplied with a charge-discharge cycle of the primary-side resonant capacitors 4C and 4D. Therefore, it is desirable that the capacitances Cp of the primary-side resonant capacitors 4C and 4D are calculated by the formula: $Cp=Po/(2\times fs\times E^2)$, where DC output power is Po, DC power supply voltage is E, and conversion frequency is fs. In a specific example, the capacitances Cp of the primary-side resonant capacitors 4C and 4D becomes 50 nF based on the formula, provided that the DC output power is 800 W, the DC power supply voltage is 400V, and the conversion frequency fs is 50 kHz.

Therefore, since the capacitances Cp of the primary-side resonant capacitors 4C and 4D, which are desirable in the present invention, and the capacitances Cs of the secondary-side resonant capacitors 7C and 7D, which are desirable in the present invention, are both allowed to pass the same values of load power, the values of the capacitances Cs of the secondary-side resonant capacitors 7C and 7D that are converted to the primary-side circuit can be set to be approximately the same values as the capacitance Cp. As described above, in the transformer 6, if the turn ratio of a secondary winding wire 60B with respect to the primary winding wire 60A is n, it gives the formula $Cp=n^2Cs$. Therefore, in the present invention, the capacitances Cp of the primary-side resonant capacitors 4C and 4D and the capacitances Cs of the secondary-side resonant capacitors 7C and 7D are fixed so as to satisfy the formula $Cp=n^2Cs$.

Figure 2:
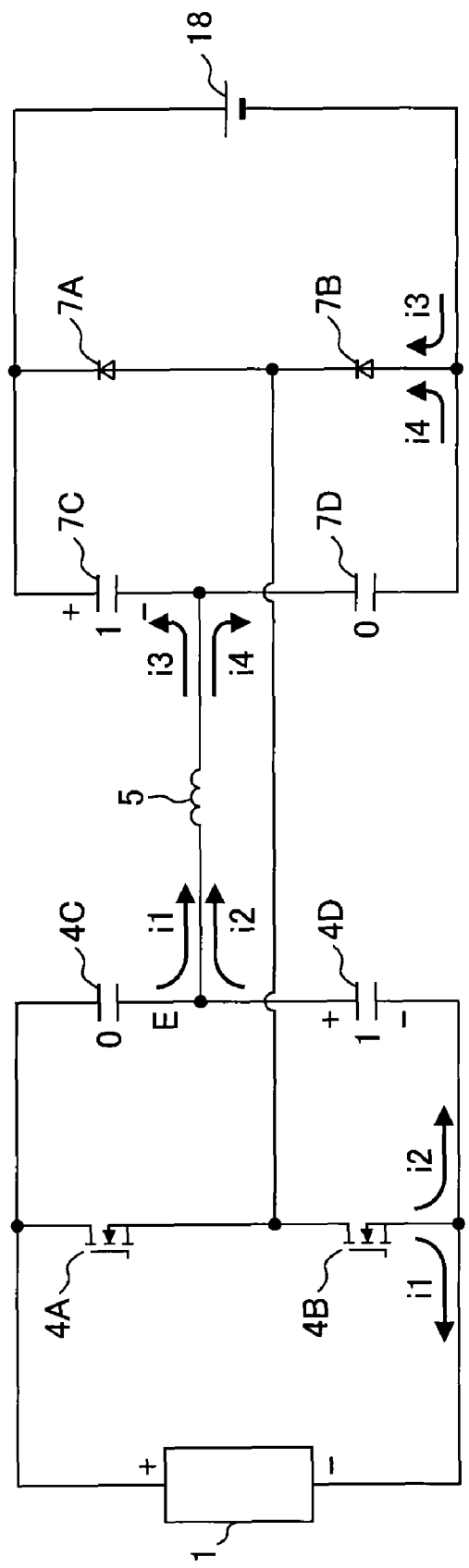
FIG. 2 is a first equivalent circuit diagram during a high load condition of the series resonant converter of FIG. 1.
Figure 3:
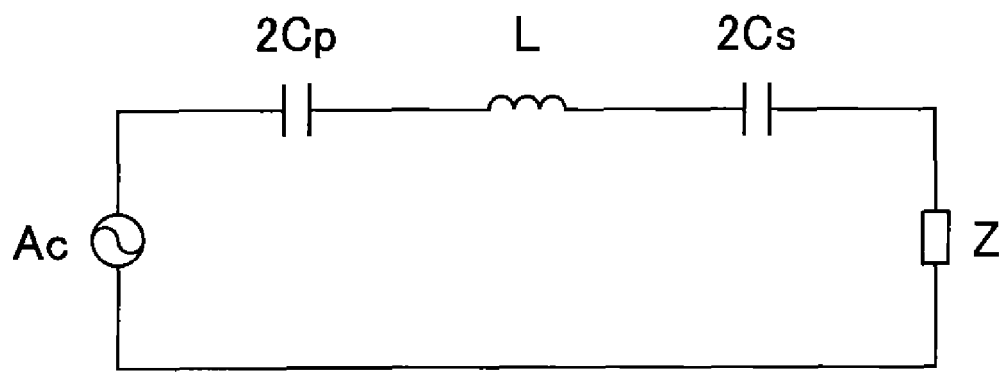
FIG. 3 is a second equivalent circuit diagram during a high load condition of the series resonant converter of FIG. 1.

Next, operations of the series resonant converter according to the first embodiment of the present invention shown in FIG. 1 is explained with reference to the equivalent circuit shown in FIG. 2 in the high load condition, the AC equivalent circuit shown in FIG. 3 for which the equivalent circuit shown in FIG. 2 is further simplified, the equivalent circuit shown in FIG. 4 in the low load condition, the AC equivalent circuit shown in FIG. 5 for which the equivalent circuit shown in FIG. 3 is further simplified, and the current waveform diagrams and the voltage waveform diagrams shown in FIGS. 6A to 6G.

In the equivalent circuit shown in FIG. 2, the transformer 6 in FIG. 1 is omitted for ease of explanation and the members on the secondary-side circuit are equivalently converted to the primary-side circuit. By way of the equivalent conversion, the DC output voltage Vo is converted to Vo/n. As described above, if the capacitances Cs of the secondary-side resonant capacitors 7C and 7D are selected to be $Cp/n^2$, the capacitances Cs of the secondary-side resonant capacitors 7C and 7D become equal to the capacitances Cp of the primary-side resonant capacitors 4C and 4D, and thus it is possible to consider all of the resonant capacitors as being the capacitance Cp.

As described above, the inverter circuit 4 is configured to be in a half-bridge configuration, and a fundamental output voltage of a half-bridge inverter circuit is E/2. Accordingly, the output voltage of the inverter circuit 4 shall be considered to be E/2. Generally, in a case in which the multi-functional rectification circuit 7 functions as a voltage doubler rectification circuit, a rectified voltage E is generated that is double the output voltage (E/2) of the inverter circuit 4, which is an input voltage. The rectified voltage E is the equivalent DC output voltage, which is 1/n. Specifically, it becomes E=Vo/n. Since both terminals of the multi-functional rectification circuit 7 are connected with the smoothing capacitor 10, the DC output voltage Vo can be considered to be a constant voltage. In the equivalent circuit that is equivalently converted to the primary-side circuit, the DC output voltage Vo is converted to an equivalent battery 18 indicating a voltage E.

Since a simulation is performed by the primary-side equivalent circuit, the transformer is omitted. Therefore, in a case in which the DC output voltage Vo is 800 V and the DC output current is 1 A in an embodiment described below, the equivalent DC output voltage E of the simulation corresponds to 400 V and the equivalent DC output current corresponds to 2 A. Accordingly, the practical output (400 V×2 A) under the low load condition corresponds to the equivalent output (200 V×4 A) of the simulation. The capacitances Cp of the primary-side capacitors 4C and 4D and the capacitances Cs of the secondary-side capacitors 7C and 7D are set to be the value described previously.

In the series resonant converter circuit of the present invention, the modes of the serial resonant operation change depending on the conditions of the impedance of the constant power load, i.e. depending on the high load condition and the low load condition. Therefore, in the following, the high load condition and the low load condition are respectively explained using the primary equivalent circuits of FIGS. 2 to 5.

Figure 6A:
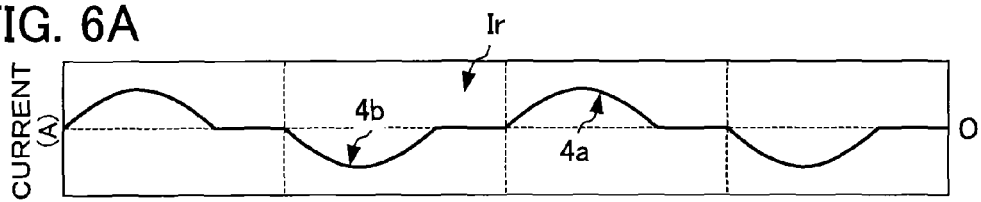
FIGS. 6A to 6G are waveform diagrams that show voltage waveforms or current waveforms illustrating the series resonant converter according to the first embodiment.
Figure 6B:
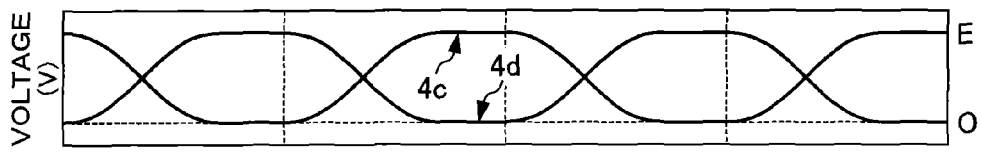
Figure 6C:
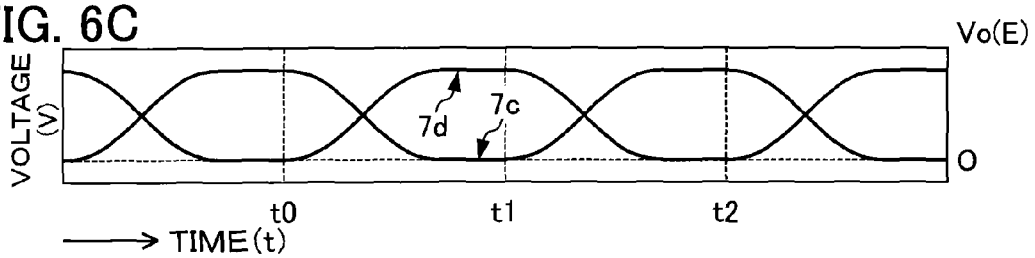

Before explaining the operations in detail, FIGS. 6A to 6G are explained. FIGS. 6A to 6C show waveforms in the high load condition. FIG. 6A shows a waveform of resonant current Ir flowing in the resonant inductance means 5. Since a positive portion of a waveform 4a is approximately equal to a current waveform of the semi-conductor switch 4A and a negative portion of a waveform 4b is approximately equal to a current waveform of a semi-conductor switch 4B, the current waveforms of the semi-conductors 4A and 4B are omitted. FIG. 6B shows a first voltage waveform 4c of the primary-side resonant capacitor 4C and a second voltage waveform 4d of the primary-side resonant capacitor 4D. FIG. 6C shows a first voltage waveform 7c of the secondary-side resonant capacitor 7C and a second voltage waveform 7d of the secondary-side capacitor 7D.

Figure 6D:
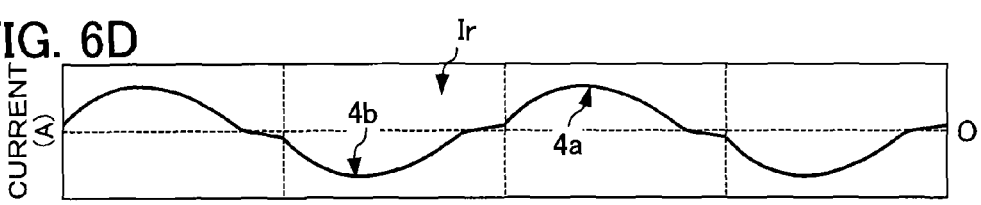
Figure 6E:
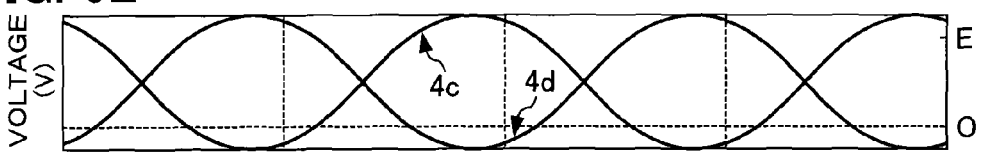
Figure 6F:
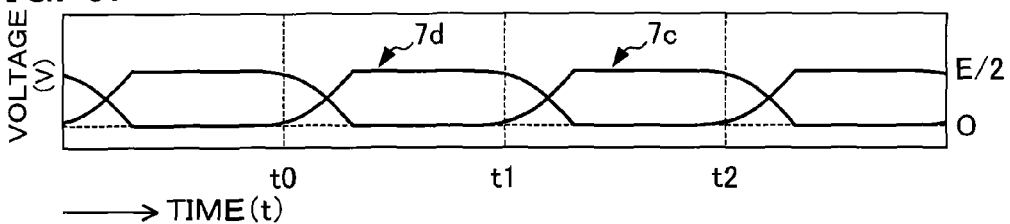

FIGS. 6D to 6F show waveforms in the low load condition. FIG. 6D shows a waveform of a resonant current Ir flowing in the resonant inductance means 5. Similarly to FIG. 6A, since a positive portion of a waveform 4a is approximately equal to a current waveform of the semi-conductor switch 4A and a negative portion of a waveform 4b is approximately equal to a current waveform of a semi-conductor switch 4B, the current waveforms of the semi-conductors 4A and 4B are omitted. FIG. 6E shows a first voltage waveform 4c of the primary-side resonant capacitor 4C and a second voltage waveform 4d of the primary-side resonant capacitor 4D. FIG. 6F shows a first voltage waveform 7c of the secondary-side resonant capacitor 7C that is equivalently converted to the primary-side circuit and a second voltage waveform 7d of the secondary-side capacitor 7D that is equivalently converted to the primary-side circuit.

Figure 6G:
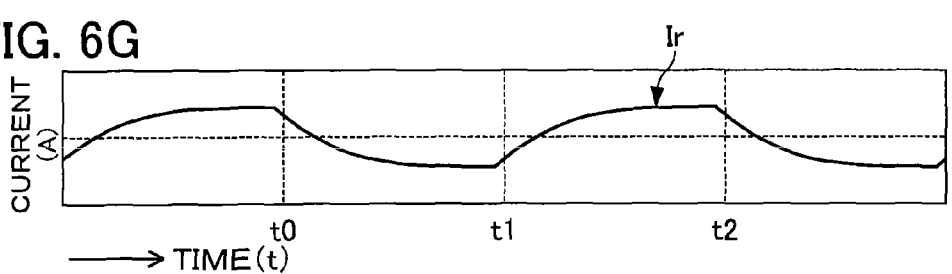
Figure 7:
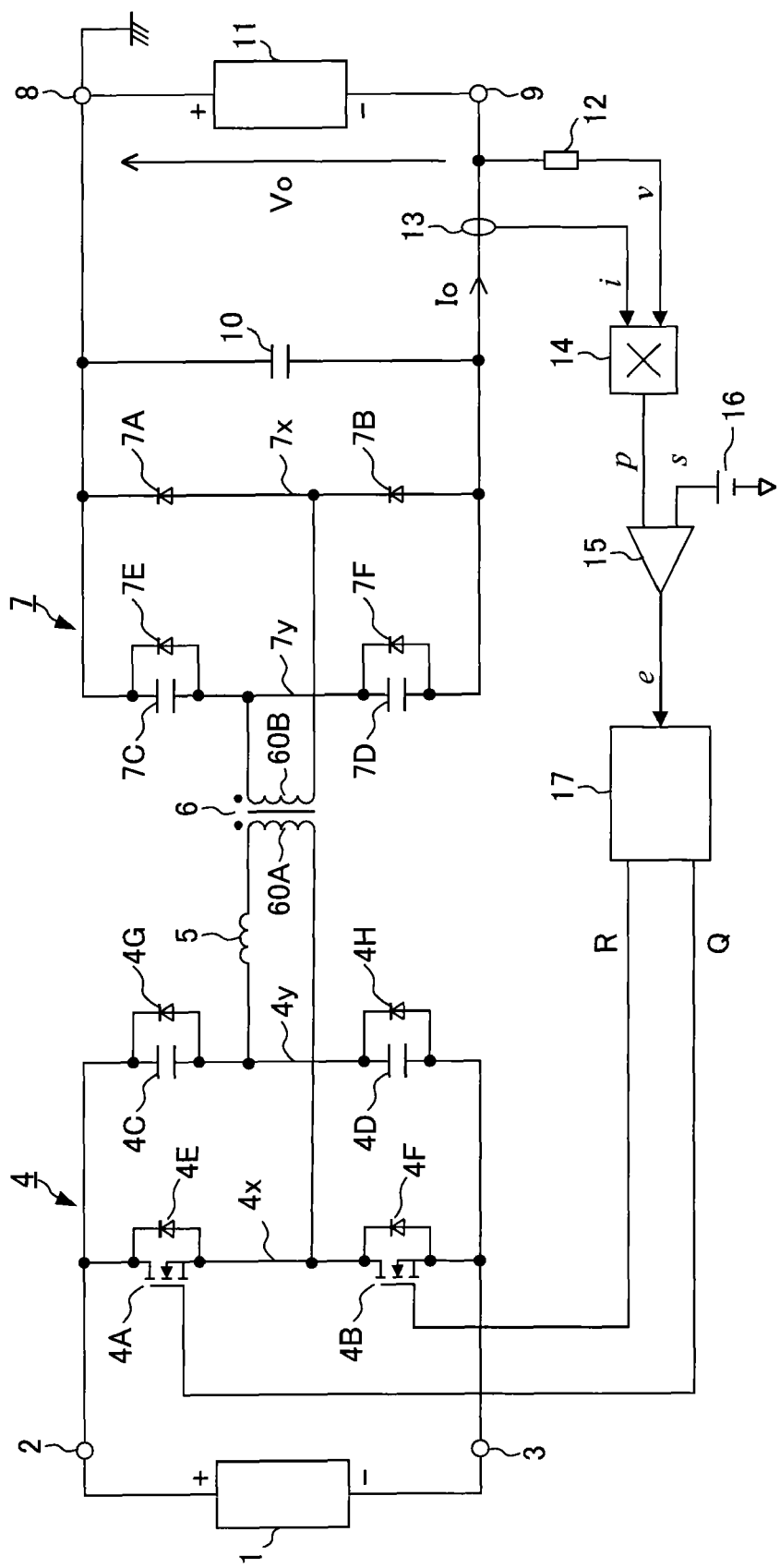
FIG. 7 is a circuit diagram showing a series resonant converter according to a second embodiment of the present invention.

FIG. 6G shows a case in which capacitances of the first primary-side resonant capacitor 4C and the second primary-side resonant capacitor 4D are considered to be capacities large enough not to be involved in resonant operations, i.e. it shows a waveform of the resonant current Ir in a case of using a simple capacitor for partial pressure in a conventional half-bridge inverter circuit.

First, the case of the high load condition is explained. In the case of the high load condition, as described above, since the capacitances Cs of the secondary-side resonant capacitors 7C and 7D are selected so that the DC output power Po is entirely supplied with the charge-discharge cycle of the secondary-side resonant capacitors 7C and 7D, even if the secondary-side resonant capacitors 7C and 7D are discharged to be zero voltage, it would not charged even to a negative polarity. Therefore, since the voltage of the secondary-side resonant capacitors 7C and 7D is applied at any time in the form of inverse voltage to the secondary-side diodes 7E and 7F that are connected in parallel to the secondary-side resonant capacitors 7C and 7D, it is not conducted. Accordingly, since it can be assumed that the secondary-side diodes 7E and 7F in FIG. 1 are absent, an equivalent circuit of the multi-functional rectification circuit 7 in the high load condition can be represented by the voltage doubler rectification circuit shown in FIG. 2.

As described above, the capacitances Cp of the primary-side resonant capacitors 4C and 4D are selected so that the DC output power Po is entirely supplied with the charge-discharge cycle of the primary-side resonant capacitors 4C and 4D. Therefore, in the high load condition, even if the primary-side resonant capacitors 4C and 4D are discharged to be zero voltage, it is not charged to negative polarity. Since the switching elements 4A and 4D are turned on in a half cycle of the resonant current, the feedback diodes 4E and 4F in parallel with the switching elements 4A and 4D, which are bypass circuits when the excitation current is blocked, do not conduct since the current is not blocked and excitation current of the transformer 6 is not considered for the sake of simplicity. Therefore, the explanations can be provided as if the feedback diodes 4E and 4F in FIG. 1 are absent.

Before the point in time t0 in FIGS. 6A to 6G, as shown in FIG. 2, the primary-side resonant capacitor 4D is charged with the DC power supply voltage E (denoted by "1") in the polarity thus illustrated, and the charged voltage of the primary-side resonant capacitor 4C is zero (denoted by "0"). Furthermore, the secondary-side resonant capacitor 7C is charged with the DC output voltage Vo (denoted by "1") in the polarity thus illustrated, i.e. the DC power supply voltage E, and the charged voltage of the secondary-side resonant capacitor 7D is zero (denoted by "0").

At the point in time t0, the switching element 4A is in an off state and the switching element 4B changes from off to on. As shown in FIG. 2, the current i1 flowing through the primary-side resonant capacitor 4C from the positive DC input terminal 2 and the current i2 due to the discharge of the primary-side resonant capacitor 4D join together and flow to the secondary-side circuit through the resonance inductance means 5. In the secondary-side circuit, the current flowing in the resonant inductance means 5 is distributed to the secondary-side resonant capacitors 7C and 7D to flow. One of the currents thus distributed (i3) flows to the equivalent battery 18 as discharge current of the secondary-side resonant capacitor 7C, and the other of the currents thus divided (i4) charges the secondary-side resonant capacitor 7D and joins together with the current i3 on an anode side of the rectifying diode 7B. Then, the current thus joined flows through a cathode of the diode 7B and the switching element 4B, and then the current i1 flowing through the switching element 4B of FIG. 1 flows back to the negative DC input terminal 3, and the other current i2 flowing through the switching element 4B flows back to the negative pole of the capacitor 4D.

In this operation, as shown in FIG. 6B, the primary-side resonant capacitor 4C is charged to the DC power supply voltage E from zero and the primary-side resonant capacitor 4D discharges its entire charge and its charged voltage becomes zero. As shown in FIG. 6C, the secondary-side resonant capacitor 7D is charged to the voltage Vo of the equivalent battery from zero and the secondary-side resonant capacitor 7C discharges its entire charge and its charged voltage becomes zero. As a result of this, the voltage of the primary-side resonant capacitors 4C and 4D and the secondary-side resonant capacitors 7C and 7D is inverted with respect to the initial condition prior to the switching element 4B turning on. The abovementioned operation here is a serial resonant operation of the resonant inductance means 5, the parallel circuit of the primary-side resonant capacitors 4C and 4D, and the parallel circuit of the secondary-side resonant capacitor 7C and 7D, and, as shown in FIG. 6A, the current of the switching element 4B becomes a negative sinusoidal half wave 4b. Although the switching element 4A retains the off state until the point in time t1, it is not necessary to turn on the switching element 4B until a half cycle ends, and it is also possible to turn off the switching element 4B when the current 4b of the negative sinusoidal half wave becomes zero.

Next, in the condition at the point in time t1 when the voltage of the primary-side resonant capacitors 4C and 4D and the secondary-side resonant capacitors 7C and 7D is inverted with respect to the initial condition before the switching element 4B is turned on, the switching element 4B retains the off state and the switching element 4A transitions from off to on. In this case, an operation that is opposite to that of the above description in terms of polarities is performed, and this operation here is a serial resonant operation with a combined capacitance of the resonant inductance L of the resonant inductance means 5, the parallel circuit of the primary-side resonant capacitors 4C and 4D, and the parallel circuit of the secondary-side resonant capacitor 7C and 7D. As shown in FIG. 6A, the current of the switching element 4A becomes a positive sinusoidal half wave 4a and the initial condition of each of the resonant capacitors is returned again at the point in time t2 to the value at the point in time t0.

Since the charge-discharge energy of the primary-side resonant capacitors 4C and 4D is transferred to the load 11 as electric power by the voltage of the primary-side resonant capacitors 4C and 4D and the secondary-side resonant capacitors 7C and 7D repeating charge-discharge operations from zero to E at a switching frequency, the DC output power Po becomes $Po = 2 \times Cp \times fs \times E^2 = 2 \times Cs \times fs \times E^2$.

If the equivalent circuit shown in FIG. 2 is represented as a simple AC circuit, it becomes a circuit as shown in FIG. 3. That is, the parallel capacitances 2Cp of the primary-side resonant capacitors 4C and 4D and the parallel capacitances 2Cs of the secondary-side resonant capacitors 7C and 7D are arranged in series, and since the capacitance Cp is equal to the capacitance Cs as describe above, the serial resonant capacitance becomes Cp equivalently in terms of AC. Therefore, in the high load condition, the frequency fr of the resonant current flowing in the resonant inductance means 5 and the switching elements 4A and 4B becomes a serial resonant frequency with the resonant inductance L of the resonant inductance means 5 and the resonant capacitance Cp. It should be noted that Ac denotes an AC source and Z denotes impedance of a load.

Under the conditions that the capacitances Cs of the secondary-side capacitors 7C and 7D that are equivalently converted to the primary-side circuit are approximately equal to the capacitances Cp of the primary-side capacitors 4C and 4D, and these capacitances are small compared to the capacitance of the smoothing capacitor, as well as that, with the circuit configuration as described above, the resonant capacitance Cp and the resonant inductance L are selected so that the serial resonant frequency fr by the resonant capacitance Cp and the resonant inductance L of the resonant inductance means 5 is more than the conversion frequency fs of the inverter circuit 4, the resonant current starts in zero and the resonant current Ir, which is the output current of the inverter circuit 4, becomes a sinusoidal wave with break periods as shown in FIG. 6A.

Therefore, if the switching element 4A or 4B is caused to switch with a frequency lower than the serial resonant frequency fr, zero current switching (ZCS) of the switching elements 4A and 4B can be realized. In addition, since the voltage of the secondary-side resonant capacitors 7C and 7D does not become more than the DC power supply voltage E equivalently or a path for discharging the charge of the secondary-side resonant capacitors 7C and 7D to the DC input terminal capacitors 7C and 7D is blocked by the rectifying diodes 7A and 7B, the current does not flow in the feedback diodes 4E and 4F (FIG. 1) in the high load condition, and a recovery phenomenon does not occur. In this way, it is possible to reduce the power loss of the inverter circuit 4.

Next, operations are explained in a case of low impedance load, i.e. low load condition where the equivalent DC output voltage E becomes approximately half and the equivalent DC output current becomes double. In the high load condition, the charged voltage of the secondary-side resonant capacitors 7C and 7D becomes E and the charge Qh of the secondary-side resonant capacitors 7C and 7D is Cs×E. However, in the low load condition, the charged voltage of the secondary-side resonant capacitors 7C and 7D becomes E/2, and the charge Qh of the secondary-side resonant capacitors 7C and 7D becomes Cs×E/2, which is half the value in the high load condition. Simultaneously, since the load current is large at double the value in the high load condition, such a small capacitance Cs of the secondary-side resonant capacitors 7C and 7D selected for the high load condition can only supply current for a quarter of the period the high load condition. Therefore, the charged voltage of the secondary-resonant capacitors 7C and 7D decreases down to approximately zero, after which the secondary-diodes 7E and 7F (FIG. 1) that are connected in parallel to the secondary-side capacitors 7C and 7D conduct. Since the period of discharge current from the secondary-side resonant capacitors 7C and 7D is for a quarter of the high load condition, most current is supplied through the secondary-side diodes 7E and 7F. Therefore, in a case of ignoring the amount of the contribution of the secondary-side resonant capacitors 7C and 7D and assuming that all of the negative load current flows through the secondary-side diodes 7E and 7F, the primary-side-converted equivalent circuit is configured as shown in FIG. 4.

Specifically, the multi-functional rectification circuit 7 is not a voltage doubler rectification circuit, but rather a normal full-wave rectifier circuit composed of the rectifying diodes 7A and 7B and the secondary-side diodes 7E and 7F, and thus the voltage doubler function is lost. That is, in the low load condition, the secondary-side resonant capacitors 7C and 7D do not contribute to serial resonance. Therefore, the primary-side-converted equivalent circuit shown in FIG. 4 can be represented by the AC circuit shown in FIG. 5 in terms of AC. As is evident from this AC circuit, the resonant capacitance under the low load condition is approximately double (2Cp) the resonant capacitance in the high load condition.

In the embodiment of FIG. 1, the diodes are not connected in parallel to the primary-side resonant capacitors 4C and 4D as in the embodiments described later. For this reason, in the low load condition, when the inverter circuit 4 is caused to operate with the same frequency as the high load condition, as shown in FIG. 4, the primary-side resonant capacitors 4C and 4D is charged up to at least the DC power supply voltage E or charged to reverse polarity. Thus, the output voltage of the inverter circuit 4 in a half-bridge configuration becomes at least E/2 and the rectified voltage of the multi-functional rectification circuit 7 becomes at least E/2. In order to limit the DC output voltage to E/2, the conversion frequency is lowered down to 45 kHz in the simulation. In addition, since the primary-side resonant capacitor 4D is charged up to at least the DC power supply voltage E, feedback current to the DC power supply 1 flows through the feedback diodes 4E and 4F.

Feedback current flows through the feedback diodes 4E and 4F during a period between a positive sinusoidal half wave 4a and a negative sinusoidal half wave 4b of the resonant current Ir shown in FIG. 6D, i.e. a period in which both the switching elements 4A and 4B are off. Operations in the low load condition are explained with such an assumption. It is assumed here that, immediately before the point in time t0 in FIGS. 6A to 6G, the primary-side resonant capacitor 4D is charged up to at least the DC power supply voltage E, and the charged voltage of the primary-side resonant capacitor 4C is negative polarity. At the point in time t0, the switching element 4B turns on. The current i1 flowing through the primary-side resonant capacitor 4C from the positive terminal of the current power supply 1 and the discharge current i2 of the primary-side resonant capacitor 4D join together to make current io, and as shown in FIG. 6D, this current io flows in the resonant inductance means 5. The current io further flows to the load 11 through the secondary-side diode 7E, through the rectifying diode 7B, and then in the switching element 4B of the inverter circuit 4, and is distributed to the current i1 and i2 at the negative terminal of the switching element 4B. In other words, the current i1 returns to the DC input terminal 3, i.e. the negative terminal of the DC power supply 1, and the current i2 returns to the negative terminal of the primary-side resonant capacitor 4D.

As a result of the above operations, each of the voltages of the primary-side resonant capacitors and secondary-side resonant capacitors is inverted with respect to the initial condition before the switching element 4B is turned on. The abovementioned operation here is a serial resonant operation of the resonant inductance L of the resonant inductance means 5 and the resonant capacitance 2Cp of the parallel circuit of the primary-side resonant capacitors 4C and 4D, and, as shown in FIG. 6D, the current of the switching element 4B becomes a negative sinusoidal half wave 4b. At this time, since the primary-side resonant capacitor 4C is charged up to at least the DC power supply voltage E, as shown in FIG. 6E, when the switching element 4B turns off, the charge of at least the DC power supply voltage E flows until the point in time t1 through the DC power supply 1 and the feedback diode 4F as feedback current.

Next, when the switching element 4A turns on at the point in time t1, the voltage of the primary-side resonant capacitors 4C and 4D are operated with a polarity opposite to that in the above explanation on the condition that is inverted with respect to the initial condition before the switching element 4B turns on, as shown in FIG. 6E, and the switching element 4A flows the current 4A of a positive sinusoidal half wave. At this time, when the switching element 4A turns off, as described above, the charge of at least the DC power supply voltage E flows through the DC power supply 1 and the feedback diode 4E as feedback current until the point in time t2. At the point in time t2, the initial condition of the primary-side resonant capacitors 4C and 4D returns again to the same state as at the point in time t0.

Figure 4:
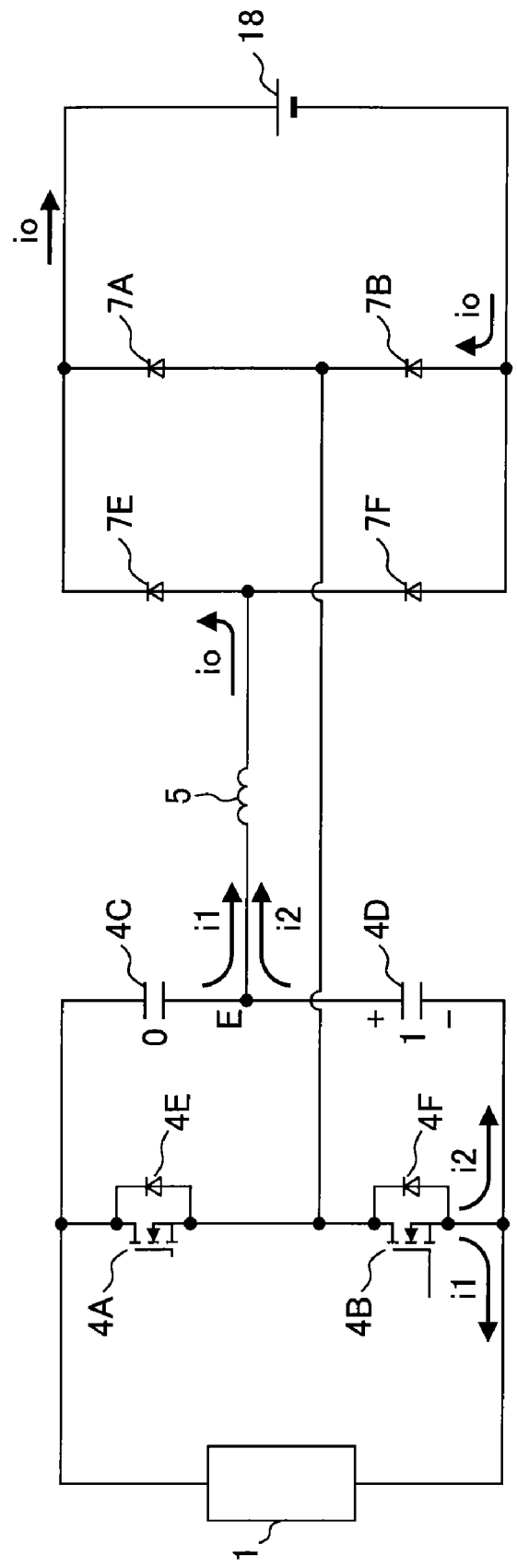
FIG. 4 is a first equivalent circuit diagram during a low load condition of the series resonant converter of FIG. 1.
Figure 5:
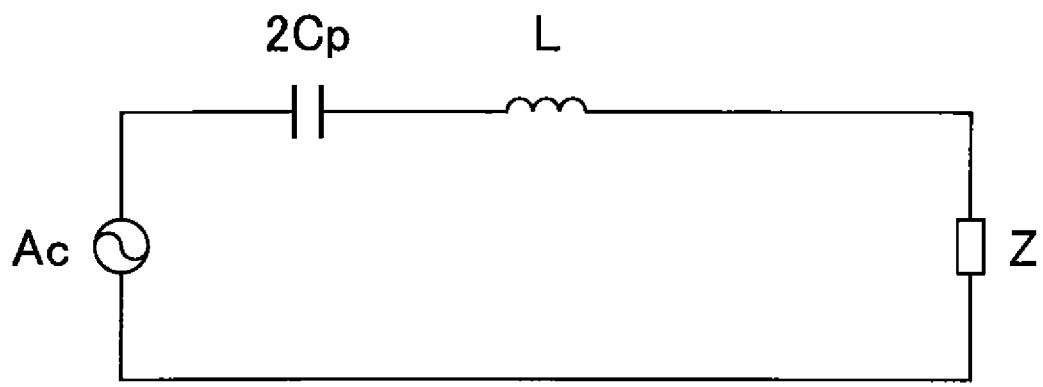
FIG. 5 is a second equivalent circuit diagram during a low load condition of the series resonant converter of FIG. 1.

The equivalent circuit of the primary-side-converted equivalent circuit shown in FIG. 4 in terms of AC is the circuit shown in FIG. 5. That is, since what is involved in serial resonance is only the primary-side resonant capacitors 4C and 4D, the equivalent resonant capacitance becomes 2Cp. The resonant frequency fr2 of resonant current flowing in the resonant inductance means 5 and the switching elements 4A and 4B becomes a serial resonant frequency by the resonant inductance L of the resonant inductance means 5 and the resonant capacitance 2Cp. Since the resonant capacitance during low load becomes approximately double the resonant capacitance during high load, the resonant frequency fr2 becomes a lower frequency than the resonant frequency 1 during the high load condition (fr2<fr1).

Therefore, switching of the switching elements 4A and 4B is controlled so that the conversion frequency fs of the inverter circuit 4 does not become the first resonant frequency fr1 during the high load condition, but rather becomes a frequency close to the second resonant frequency fr2. In this specific example, the conversion frequency fs of the inverter circuit 4 is approximately 50 kHz, and the second resonant frequency fr2 during low load is 50 kHz, which is lower than the resonant frequency fr1 during high load.

Here, selection of the resonant inductance L of the resonant inductance means 5 is explained. As described above, since the resonant capacitance in the low load condition becomes approximately double the resonant capacitance in the high load condition, naturally, the second resonant frequency fr2 in the low load condition becomes lower than the first resonant frequency fr1 in the high load condition, and thus only the load condition must be considered for selection of the resonant inductance L. That is, if the resonant inductance L of the resonant inductance means 5 resonates in series with the equivalent capacity 2Cp of the primary-side resonant capacitor in the low load condition and is a value for which a half cycle of a resonant waveform becomes a time shorter than a half cycle of the conversion frequency, the current flowing in the switching elements 4A and 4B can start from zero and end at zero, and can retain zero current switching. In an example of a simulation, the equivalent capacity 2Cp is 100 nF, and if calculating the serial resonant frequency that is set to 50 kHz, which is the same as the conversion frequency, the value of the resonant inductance L becomes 101 µH. When confirming this in the simulation, the value is 100 µH, which is the same as that in the embodiment, and a half cycle of the resonant current waveform is fit within 10 µs, which is a half cycle of the conversion frequency.

Accordingly, as compared to the resonant current of the conventional half-bridge inverter circuit shown in FIG. 6G, it is possible to improve the resonant current in a case of the low load condition of the invention to be a sinusoidal waveform and to reduce power loss. In addition, in a case of the conventional half-bridge inverter circuit, a capacitor with capacitance of 5 µF was used as a capacitor corresponding to the capacitors 4C and 4D, and the resonant inductance was 100 µH. The simulation was performed at almost the same conditions except for the above. In this case, the capacitor with large capacitance such as 5 µF is maintained at a voltage approximately half the DC power supply voltage E and does not contribute to serial resonance. Therefore, in a case of the high load condition, the resonant circuit becomes resonant with the capacitance of a capacitor corresponding to the secondary-side resonant capacitors 7C and 7D and the resonant inductance L. From the above descriptions, in the low load condition, since it can be assumed that capacitors corresponding to the secondary-side resonant capacitors 7C and 7D are absent, it can be assumed that the resonant circuit does not perform resonance.

Figure 8A:
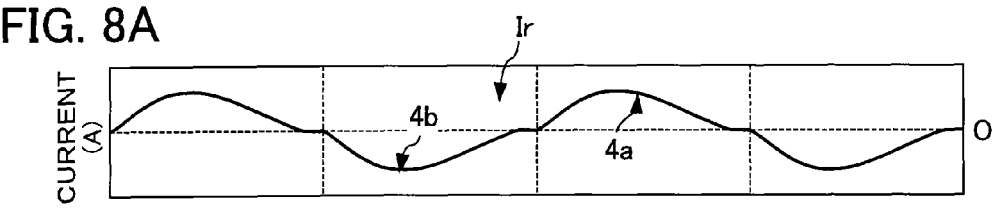
FIGS. 8A to 8D are waveform diagrams that show voltage waveforms or current waveforms during a low load condition illustrating the series resonant converter according to the second embodiment.
Figure 8B:
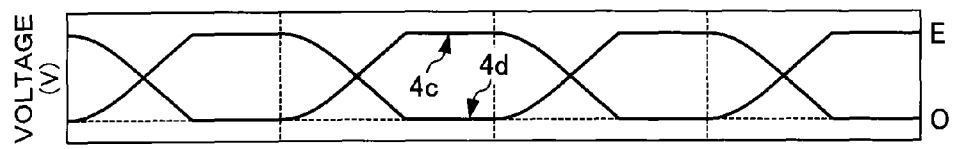
Figure 8C:
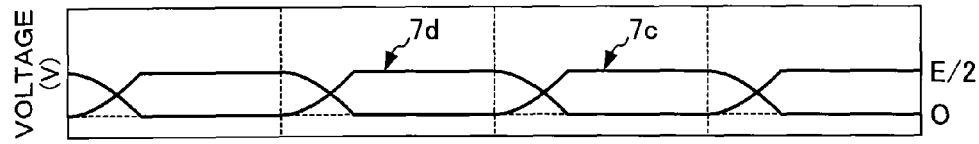
Figure 8D:
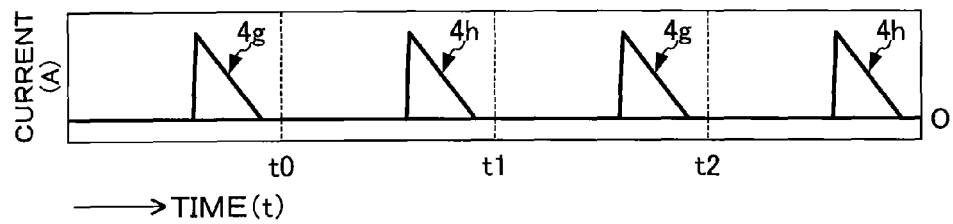

Next, a second embodiment according to the present invention is explained with reference to FIGS. 7 and 8A to 8D. A difference between the serial resonant inverter circuit shown in FIG. 7 and the circuit shown in FIG. 1 is that reverse charge prevention-voltage limitation diodes 4G and 4H are connected to the primary-side resonant capacitors 4C and 4D, respectively, in order to reduce or eliminate the feedback current in the low load condition as described above. Therefore, descriptions are made in the context of this point of difference in the following. FIGS. 8A to 8D show waveforms when a simulation with the same conditions as in the first embodiment is performed in the low load condition, except for reverse charge prevention-voltage limitation diodes 4G and 4H being provided. FIG. 8A is a waveform of the resonant current Ir flowing in the resonant inductance means 5 and shows current which is combined with the positive sinusoidal wave current 4a of the switching element 4A and the negative sinusoidal wave current 4b of the switching element 4B, similarly to FIGS. 6A to 6G FIG. 8B shows a voltage waveform 4c of the primary-side resonant capacitor 4C and a voltage waveform 4*d* of the primary-side resonant capacitor 4D. FIG. 8C shows a voltage waveform 7*c* of the secondary-side resonant capacitor 7C and a voltage waveform 7*d* of the secondary-side resonant capacitor 7D. FIG. 8D shows a waveform 4*g* of current flowing in a reverse charge prevention-voltage limitation diode 4G and a waveform 4*h* of current flowing in a reverse charge prevention-voltage limitation diode 4H, respectively.

First, the reverse charge prevention-voltage limitation diodes 4G and 4H that are connected to the two primary-side resonant capacitors 4C and 4D, respectively, are described. As described in the first embodiment, in the high load condition, since the voltage of the secondary-side resonant capacitors 7C and 7D is always applied in the form of inverse voltage to the secondary-side diodes 7E and 7F that are connected in parallel to the secondary-side resonant capacitors 7C and 7D, they do not conduct. In the same way, the since voltage of the secondary-side resonant capacitors 7C and 7D is applied in the form of inverse voltage to the reverse charge prevention-voltage limitation diodes 4G and 4H, they do not conduct. Therefore, the equivalent circuit of the second embodiment in the high load condition is similar to those in FIGS. 2 and 3, and the explanations of the operations thereof are omitted due to being similar to the first embodiment.

However, in the low load condition, as described above, since the multi-functional rectification circuit 7 is a normal full-wave rectification circuit and does not have a voltage doubler function, if the charged voltage of the primary-side resonant capacitor 4D exceeds the DC power supply voltage E, the reverse charge prevention-voltage limitation diode 4G that is connected in series to the primary-side resonant capacitor 4D will conduct, while on the other hand, if the primary-side resonant capacitor 4D is charged to negative polarity, the reverse charge prevention-voltage limitation diode 4H that is connected in parallel to the primary-side resonant capacitor 4D conducts to flow the currents 4*g* and 4*h* shown in FIG. 8D. To describe this point in detail, the primary-side resonant capacitor 4D is charged in the fashion as described above, and if the charged voltage exceeds the DC power supply voltage E, the reverse charge prevention-voltage limitation diode 4G is forward biased and conducts according to the voltage as a difference between the charged voltage and the DC power supply voltage E. Since the same applies to the primary-side resonant capacitor 4C, an explanation thereof is omitted. It should be noted that the scale of the waveform of the resonant current Ir shown in FIG. 8A is represented as being larger than that of the waveform of the resonant current Ir in FIG. 6A.

In addition, if the primary-side resonant capacitor 4D is charged to negative polarity, the reverse charge prevention-voltage limitation diode 4H is similarly forward biased and conducts. The current flowing in the reverse charge prevention-voltage limitation diodes 4H and 4G flows to the DC input terminals 2 and 3 and is fed back to the DC power supply 1. At this time, the feedback diodes 4E and 4F are not conducted and does not flow the feedback current. Therefore, when the switching elements 4A and 4B are turned off, recovery current does not flow in the feedback diodes 4E and 4F in a reverse direction, and recovery loss is not generated. The charged voltage of the primary-side resonant capacitors 4C and 4D is limited down approximately to the DC power supply voltage E as shown in FIG. 8C.

In this situation, with the first embodiment which does not have the reverse charge prevention-voltage limitation diodes 4G and 4H, the primary-side resonant capacitors 4C and 4D exceed the DC power supply voltage E as shown in FIG. 6E. Therefore, in the low load condition of the first embodiment, the feedback current flows to the DC power supply 1 through the feedback diode 4F or 4E that is connected in parallel with an opposite polarity to the switching elements 4B or 4A as described above, next to the resonant current with positive or negative polarity flowing in the switching element 4A or 4B. If the switching element 4A or 4B turns on when this feedback current flows through the feedback diode 4F or 4E, since the current flows in an opposite direction in the feedback diode 4F or 4E of which a reverse blocking characteristic is still not restored, recovery loss, i.e. power loss, occurs and problems such as surge voltage and noise generation are caused.

However, in the second embodiment, since the reverse charge prevention-voltage limitation diodes 4G and 4H limit the voltage of the primary-side resonant capacitors 4C and 4D to approximately the DC power supply voltage E and the switching element 4A or 4B conducts with the feedback diodes 4E or 4F so as not to flow the feedback current to the DC power supply 1, surge voltage or noise generation due to the feedback diode 4E or 4F does not occur. However, in the second embodiment, the feedback diode 4E or 4F is not necessary in principle. It should be noted that, in the low load condition, the equivalent circuit of FIG. 7 in terms of AC can be assumed to be the same as that of FIG. 5.

Figure 9:
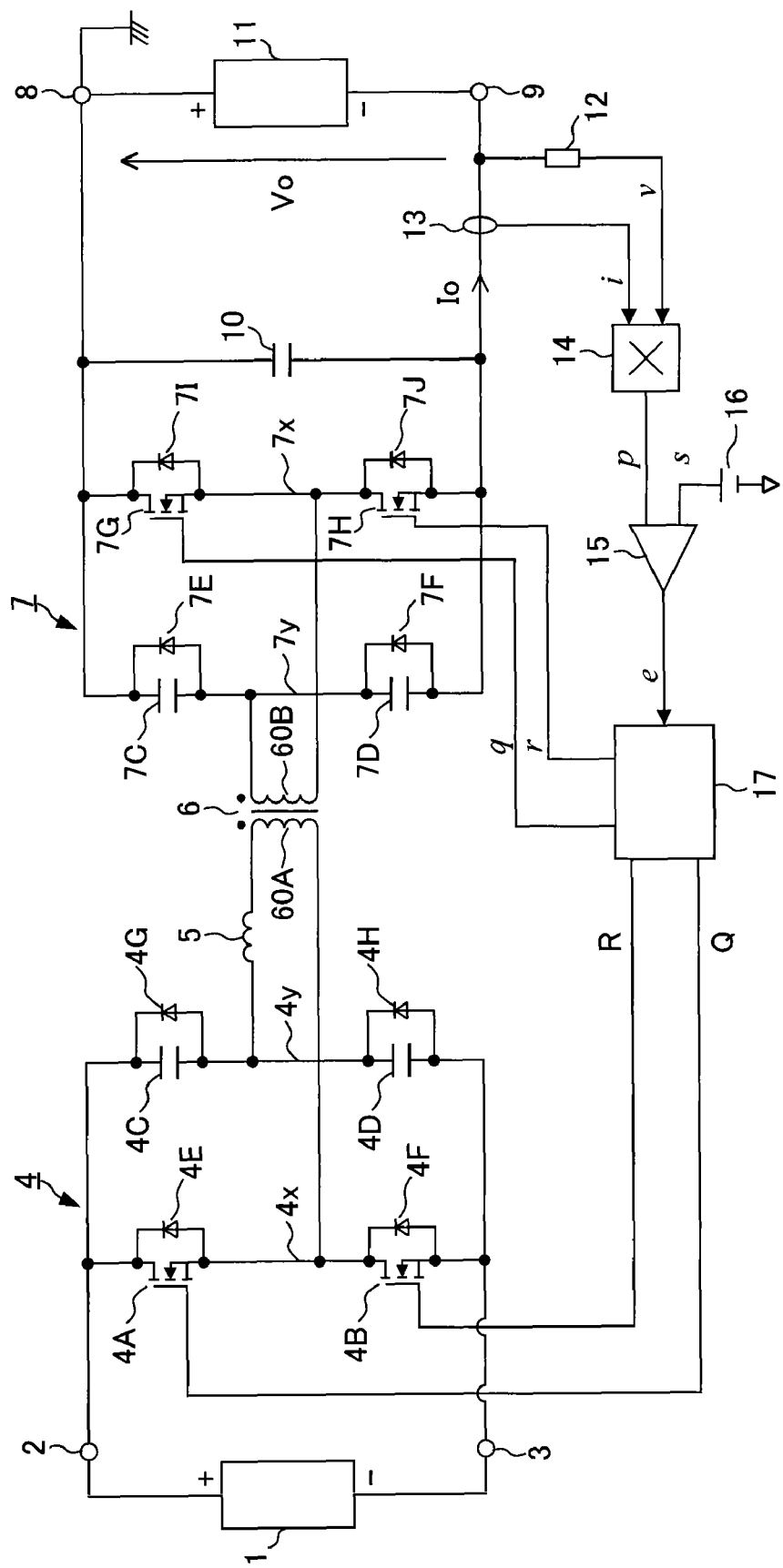
FIG. 9 is a circuit diagram showing a series resonant converter according to a third embodiment of the present invention.

FIG. 9 shows a series resonant converter circuit according to a third embodiment in which synchronous rectification is applied to a secondary-side multi-functional rectification circuit 7. The rectifying diodes 7A and 7B of the secondary-side multi-functional rectification circuit 7 in the previous embodiment are replaced with rectifying MOSFETs 7G and 7H. 7I and 7J indicate internal diodes that the rectifying MOSFET 7G and MOSFET 7H respectively include. The rectifying MOSFETs 7G and 7H are alternately driven by gate signals q and r from a control circuit 17. When MOSFETs are used as the switching elements 4A and 4B of the primary-side inverter circuit 4, the MOSFET 4A of the inverter circuit 4 and the rectifying MOSFET 7G of the multi-functional rectification circuit 7 are driven by the same gate signals Q and q, and the MOSFET 4B of the inverter circuit 4 and the rectifying MOSFET 7H of the multi-functional rectification circuit 7 are driven by the same gate signals R and r.

In this series resonant converter circuit, by replacing the diode of the secondary-side multi-functional rectification circuit 7, in which current flows when the switching element of the primary-side inverter circuit 4 turns on, with the internal diode of the rectifying MOSFET, power loss is reduced due to the on-resistance thereof being small. This is similar to the embodiment of FIG. 7 except for the rectifying MOSFETs 7G and 7H of the secondary-side multi-functional rectification circuit 7 operating as diodes, and thus the explanations thereof are omitted. It should be noted here that the rectifying diodes 7A and 7B of the multi-functional rectification circuit 7 and the rectifying MOSFETs 7G and 7H refer to a unidirectional element.

Figure 10:
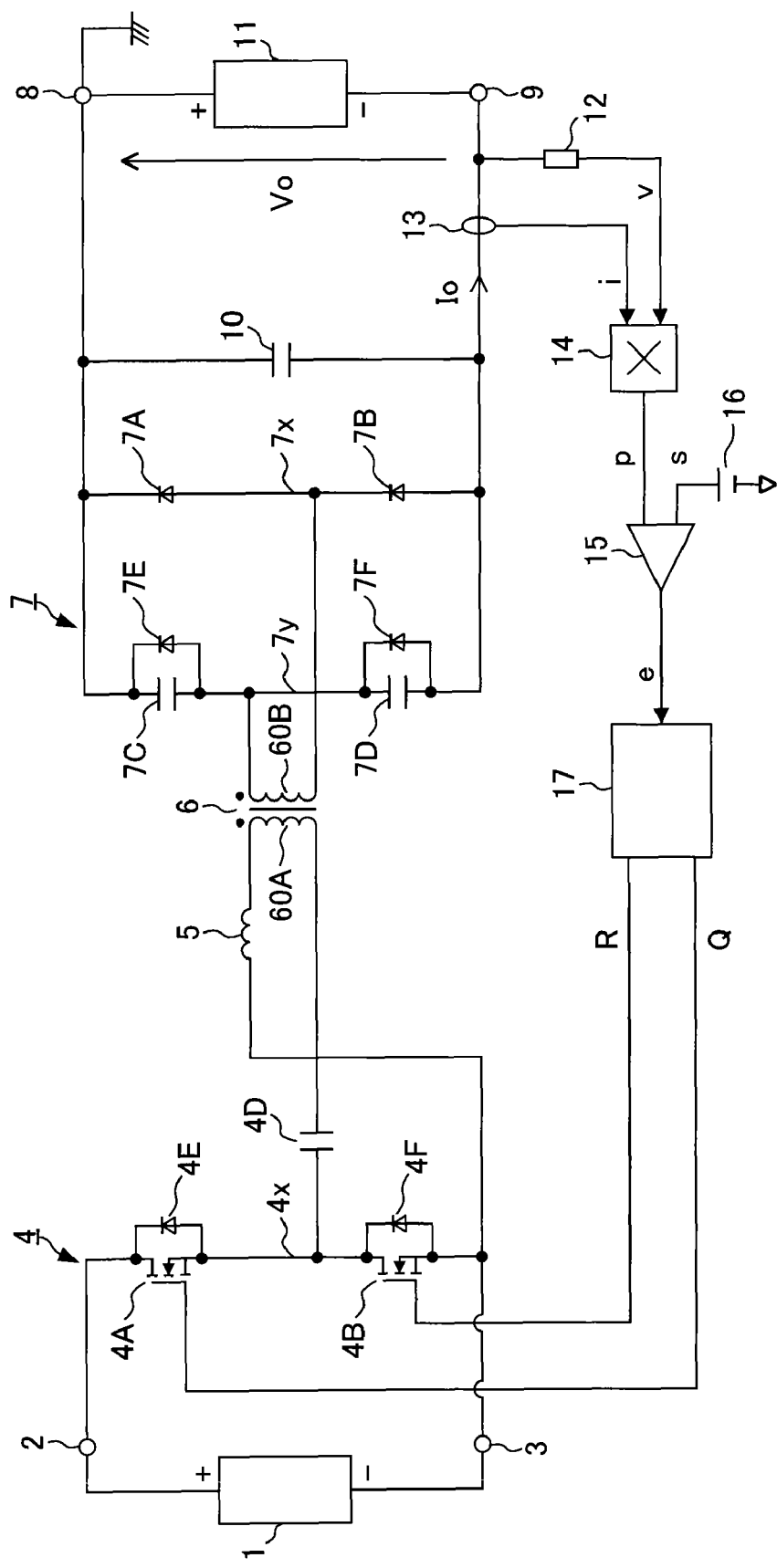
FIG. 10 is a circuit diagram showing a series resonant converter according to a fourth embodiment of the present invention.

FIG. 10 shows a series resonant converter circuit according to a fourth embodiment. This is an example in which the two primary-side resonant capacitors 4C and 4D of the inverter circuit 4 in a half-bridge configuration in the first embodiment shown in FIG. 1 are put together in one single primary-side resonant capacitor 4D. The other circuit configurations are substantially the same as the circuit configuration of FIG. 1. Therefore, the capacitance of the primary-side resonant capacitor 4D in this embodiment is approximately twice the capacitance of the primary-side resonant capacitor of the first embodiment of FIG. 1. In the previous embodiment with 800 W, since the capacitance Cp of the primary-side resonant capacitors 4C and 4D are 50 nF, respectively, the capacitance of this primary-side resonant capacitor 4D becomes approximately 100 nF.

In the series resonant converter circuit according to the fourth embodiment, waveforms are produced which are similar to those of FIG. 1 for both the high load condition and the low load condition. However, in this fourth embodiment, it is not possible to connect the reverse charge prevention-voltage limitation diode (described above) in parallel to the primary-side resonant capacitor 4D in order to eliminate the feedback current in the low load condition such as in the second embodiment. In a case of using this diode, when the switching element 4B turns on, the primary-side resonant capacitor 4D is charged with the right side of the primary-side resonant capacitor 4D being a positive terminal, a result of which shunt occurs inconveniently through the diode. However, compared to the series resonant converter circuit according to the first embodiment, the series resonant converter circuit according to the fourth embodiment reduces the number of the primary-side resonant capacitors 4D and can exert an effect of simplifying its circuit configuration as well as being able to exert effects similar to those of the series resonant converter circuit according to the first embodiment.

Figure 11:
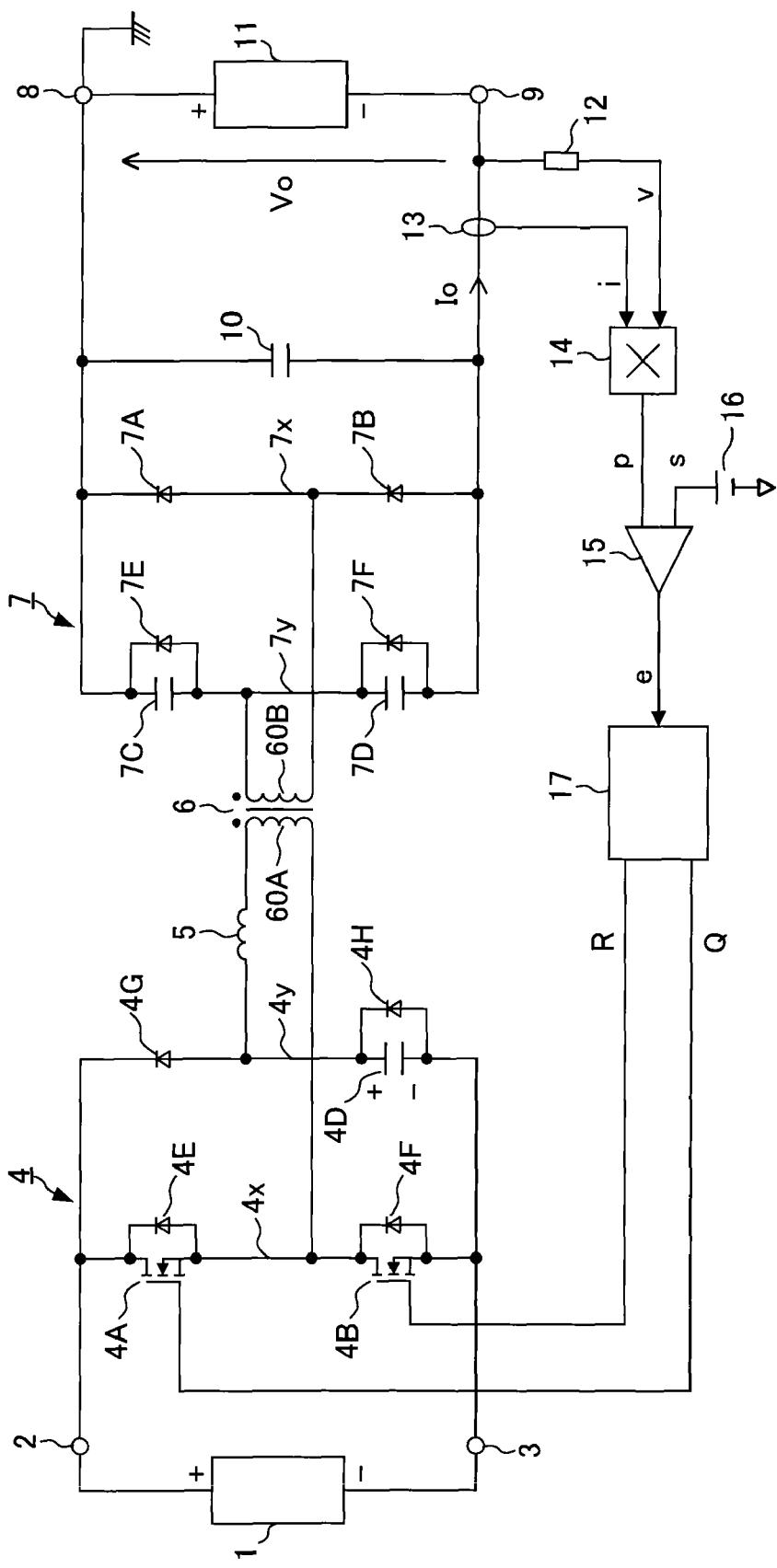
FIG. 11 is a circuit diagram showing a series resonant converter according to a fifth embodiment of the present invention.

A series resonant converter circuit according to a fifth embodiment shown in FIG. 11 can solve the problem in regard to the feedback current as well as can eliminate one primary-side resonant capacitor, similarly to the fourth embodiment. As compared to the series resonant converter circuit shown in FIG. 7, the series resonant converter circuit according to the fifth embodiment has a circuit configuration in which the primary-side resonant capacitor 4C is eliminated. Since the other circuit configurations are substantially the same as the circuit configurations of FIG. 7, different portions and associated portions thereof are described.

In the series resonant converter according to the fifth embodiment, when the switching element 4A turns on, the primary-side resonant capacitor 4D is charged through a primary winding wire 60A of a transformer 6 and the resonant inductance means 5 with an upper terminal of the primary-side resonant capacitor 4D being positive terminal In addition, when the switching element 4B turns on, the charge of the primary-side resonant capacitor 4D is discharged through the primary-side winding sire 60A of the transformer 6 and the resonant inductance means 5.

When the primary-side resonant capacitor 4D is charged with reverse polarity, i.e. when charged so that the voltage of the upper terminal of the primary-side resonant capacitor 4D in FIG. 11 is lower than the voltage of the lower terminal thereof, the diode 4H in parallel to the primary-side resonant capacitor 4D conducts and prevents a reverse polarity charging of the primary-side resonant capacitor 4D. Therefore, since the series resonant converter circuit according to the fifth embodiment does not cause inconvenience with a simple circuit configuration and, as described above, the feedback current does not flow through the feedback diode 4E or 4F, it is possible to further obtain an effect of being able to reduce recovery loss or noise due to the feedback diode 4E or 4F during the switching elements 4A and 4B. In the fifth embodiment, the diode 4G limits the charged voltage of the primary-side resonant capacitor 4D, and the diode 4H prevents the opposite polarity charge of the primary-side resonant capacitor 4D.

According to the present invention as described above, even if the DC output voltage and the DC output current greatly fluctuate due to the change in load impedance in a state in which the conversion frequency of the inverter circuit 4 is maintained to be approximately constant and the constant power output is supplied to a load, the resonant frequency changes as the resonant capacitance changes. Accordingly, by selecting the resonant capacitance, the resonant inductance, and the conversion frequency so that the change in this resonant frequency is made within the range including the conversion frequency of the inverter circuit 4, it is possible to maintain the resonant current waveform as a sinusoidal wave or close thereto in a state of the constant power output being maintained without changing the conversion frequency, a result of which power loss can be reduced. In addition, surge voltage or noise due to the feedback diode 4E or 4F does not occur.

It should be noted that, although the embodiments explain examples using pulse-frequency modulation control, this is for handling, for example, a light load condition, an abnormal condition, or a change in the required load power, and another control method may be used in principle. For example, in a case of a certain constant power condition, since conversion frequency of the inverter circuit 4 is set to be constant, a little pulse-width modulation control can sufficiently handle a normal load fluctuation or input fluctuation. Thus, the present invention is not limited to a specific control method. In addition, specific values such as conversion frequency or capacitance as described previously are merely examples and the present invention is not limited thereto. Furthermore, in the embodiments described above, although the first and second secondary-side resonant capacitors 7C and 7D have capacitances that are substantially equal to those of the primary-side resonant capacitors 4C and 4D when the first and second secondary-side resonant capacitors 7C and 7D are equivalently converted to the primary-side circuit of the transformer 6 as the most preferred example, the effects described above can be obtained even if the first and second secondary-side resonant capacitors 7C and 7D do not have capacitances that are substantially equal to those of the primary-side resonant capacitors 4C and 4D, when the first and second secondary-side resonant capacitors 7C and 7D are equivalently converted to the primary-side circuit of the transformer 6.

In the waveform of the resonant current in the present invention, it is often the case that there are current maintaining periods with the high load condition and the low load condition, i.e. break periods in which current does not flow, and the break periods are different as shown in FIGS. 6A, 6D, and 8A. The break period is an unnecessary time in which power is not supplied to the load 11 during the break period, as seen from the point of the power supply. Therefore, if a moment at which the resonant current flowing becomes zero by one switching element being turned on is detected and, at that moment, an on-signal of the one switching element is blocked while an on-signal is provided to the other switching element to turn it on simultaneously, it would be possible to shorten the break period and to supply a large amount of power to a load effectively. If performing such a minimum break period control while maintaining frequency conversion control, since there are almost no break periods, the resonant current becomes a waveform closer to a sinusoidal waveform and it is possible to derive a large amount of power as well as reduce noise.

In regards to industrial applicability, it the series resonant converter circuit of the present invention can be applied to general devices including a vacuum device, communication power supply, and the like.

What is claimed is:

1. A series resonant converter circuit, comprising:
an inverter circuit that is connected between a pair of DC input terminals to which DC input voltage is applied and has at least a first switching element and a second switching element that are alternately turned on and off;

a transformer having a primary winding wire connected to the inverter circuit and a secondary winding wire;

a resonant inductance means that is connected in series to the primary winding wire or the secondary winding wire of the transformer;

a primary-side resonant capacitor that is connected in series to the resonant inductance means and the primary-side winding wire of the transformer when the first switching element or the second switching element turns on; and a multi-functional rectification circuit that is includes a first secondary-side resonant capacitor and a second secondary-side resonant capacitor that are connected to each other in series between a pair of DC output terminals, and a first unidirectional element and a second unidirectional element that are connected to each other in series between the DC output terminals, wherein a connection point of the first secondary-side resonant capacitor and the second secondary-side resonant capacitor is connected to one end of the secondary winding wire of the transformer, when a load connected between the DC output terminals is high impedance, the multi-functional rectification circuit functions as a voltage doubler rectification circuit and the resonant inductance means cooperates with the primary-side resonant capacitor, the first secondary-side resonant capacitor, and the second secondary-side resonant capacitor to resonate in series, when a load connected between the DC output terminals is low impedance, the multi-functional rectification circuit mainly functions as a full-wave rectification circuit and the resonant inductance means mainly cooperates with the primary-side resonant capacitor to resonate in series, and current flowing in the switching element is modified so as to be close to a sinusoidal waveform in a broad load impedance.

2. The series resonant converter circuit according to claim 1, wherein, when the first secondary-side resonant capacitor and second secondary-side resonant capacitor are equivalently converted to a primary-side of the transformer, the first secondary-side resonant capacitor and second secondary-side resonant capacitor have capacitance which is substantially equal to the primary-side resonant capacitor.

3. The series resonant converter according to claim 1, wherein a reverse charge prevention-voltage limitation diode is connected in parallel or in series to the primary-side resonant capacitor, and the reverse charge prevention-voltage limitation diode limits a charged voltage of the primary-side resonant capacitor to a DC power supply voltage between the DC input terminals, and prevents the primary-side resonant capacitor from being charged with reverse polarity.

4. The series resonant converter circuit according to claim 1, wherein the inverter circuit includes a first feedback diode that is disposed in parallel to the first switching element in reverse polarity to polarity of the first switching element, and a second feedback diode that is disposed in parallel to the second switching element in reverse polarity to polarity of the second switching element.

5. The series resonant converter according to claim 1, wherein a smoothing capacitor having capacitance that is sufficiently larger than capacitance of the first secondary-side resonant capacitor and second secondary-side resonant capacitor is connected between the pair of the DC output terminals.

6. The series resonant converter according to claim 1, wherein the first switching element and second switching element operate at a frequency that is lower than a resonant frequency defined by the resonant inductance means and the primary-side resonant capacitor.

* * * * *